United States Patent
Wang et al.

(10) Patent No.: US 8,626,060 B2
(45) Date of Patent: Jan. 7, 2014

(54) BEACON SIGNALS FOR REPEATERS WITHIN A WIRELESS COMMUNICATIONS SYSTEM

(75) Inventors: Michael Mao Wang, San Diego, CA (US); Dhananjay Ashok Gore, San Diego, CA (US); Gwendolyn Denise Barriac, Encinitas, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 326 days.

(21) Appl. No.: 13/086,540

(22) Filed: Apr. 14, 2011

(65) Prior Publication Data

US 2012/0264369 A1    Oct. 18, 2012

(51) Int. Cl.
   *H04B 7/15*    (2006.01)
(52) U.S. Cl.
   USPC ........................................ 455/11.1; 455/13.4
(58) Field of Classification Search
   USPC .................... 455/11.1, 13.1, 69, 522
   See application file for complete search history.

(56) References Cited

U.S. PATENT DOCUMENTS

| 6,418,299 B1 * | 7/2002 | Ramanathan ..................... 455/7 |
| 2002/0174364 A1 * | 11/2002 | Nordman et al. .............. 713/201 |
| 2006/0234740 A1 * | 10/2006 | Sakoda ......................... 455/507 |
| 2010/0291865 A1 | 11/2010 | Gore et al. |

FOREIGN PATENT DOCUMENTS

| EP | 1734774 A1 | 12/2006 |
| EP | 2048822 A1 | 4/2009 |
| WO | 02087275 A2 | 10/2002 |
| WO | 2007064249 A1 | 6/2007 |

OTHER PUBLICATIONS

International Search Report and Written Opinion—PCT/US2012/033397—ISA/EPO—Jul. 24, 2012.

* cited by examiner

*Primary Examiner* — Tu X Nguyen
(74) *Attorney, Agent, or Firm* — Rupit M. Patel

(57) ABSTRACT

In an embodiment, a first repeater configures a beacon signal that identifies the first repeater to one or more other repeaters. The first repeater transmits the configured beacon signal at a given transmission power level to the one or more other repeaters. The transmitted beacon signal is received at least by a second repeater. The second repeater reduces interference associated with other transmissions from the first repeater, such as retransmissions of donor signals, based on the received beacon signal.

15 Claims, 8 Drawing Sheets

BEACON SIGNALS FOR REPEATERS WITHIN A WIRELESS COMMUNICATIONS SYSTEM

BACKGROUND

1. Field of the Invention

Embodiments of the invention relate to beacon signals for repeaters within a wireless communications system.

2. Relevant Background

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (W-CDMA), CDMA2000 (such as CDMA2000 1xEV-DO standards, for example) or TD-SCDMA.

In W-CDMA wireless communication systems, user equipments (UEs) receive signals from fixed position Node Bs (also referred to as cell sites or cells) that support communication links or service within particular geographic regions adjacent to or surrounding the base stations. Node Bs provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the Node Bs generally interact with UEs through an over the air interface and with the RAN through Internet Protocol (IP) network data packets.

Wireless repeaters can be positioned within wireless communication systems in order to extend the range or coverage area of one or more Node Bs. In the uplink direction, the wireless repeaters receive signals from UEs and retransmit the received signals to a given Node B. In the downlink direction, the wireless repeaters receive signals from the given Node B and retransmit the received signals to UEs.

SUMMARY

In an embodiment, a first repeater configures a beacon signal that identifies the first repeater to one or more other repeaters. The first repeater transmits the configured beacon signal at a given transmission power level to the one or more other repeaters. The transmitted beacon signal is received at least by a second repeater. The second repeater reduces interference associated with other transmissions from the first repeater, such as retransmissions of donor signals, based on the received beacon signal.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
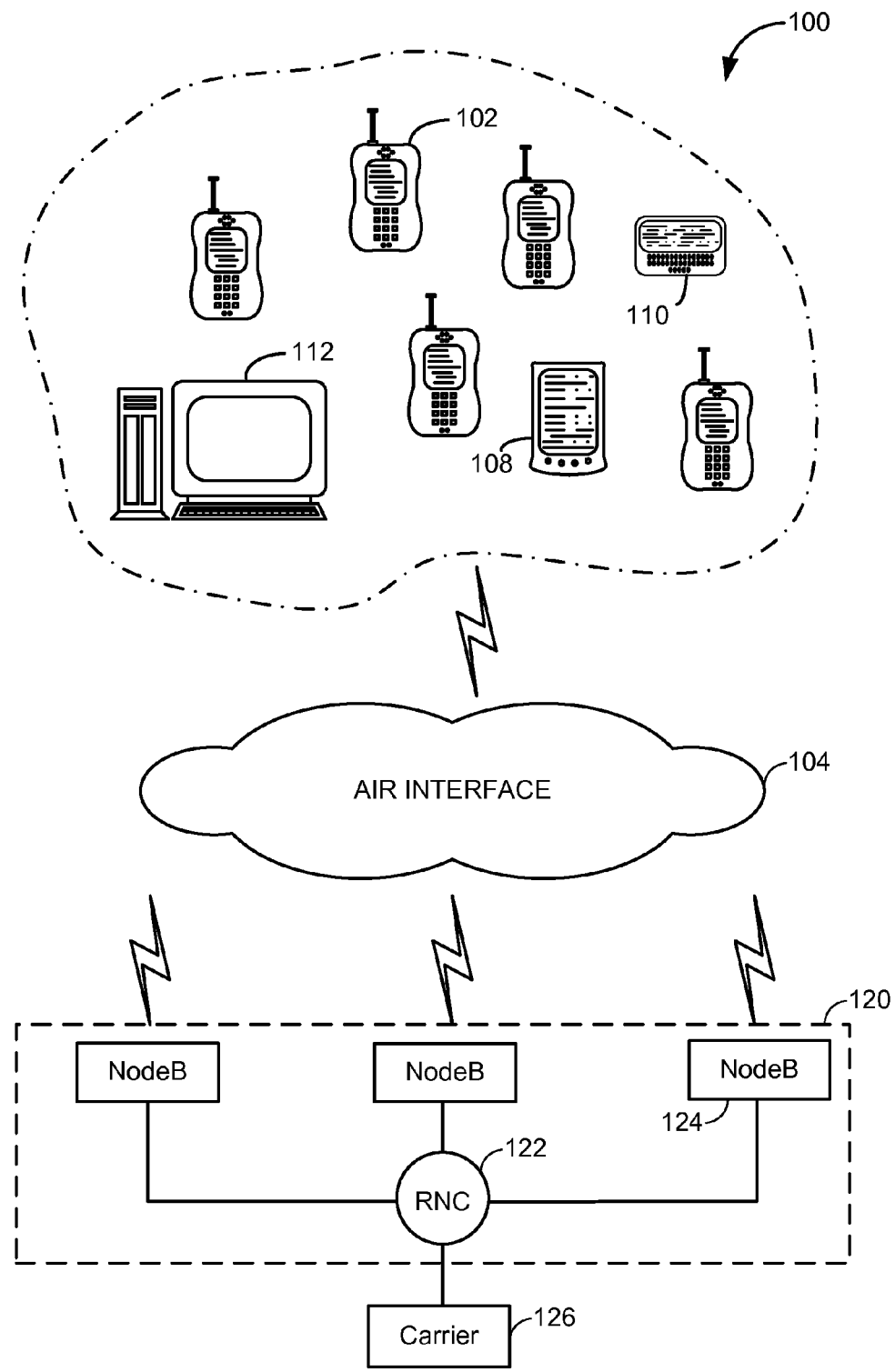
FIG. 1 is a diagram of a wireless network architecture that supports access terminals and access networks in accordance with at least one embodiment.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as a user equipment (UE), may be mobile or stationary, and may communicate with one or more access points (APs), which may be referred to as Node Bs. A UE transmits and receives data packets through one or more of the Node Bs to a Radio Network Controller (RNC). The Node Bs and RNC are parts of a network called a radio access network (RAN). A radio access network can transport voice and data packets between multiple access terminals.

The radio access network may be further connected to additional networks outside the radio access network, such core network including specific carrier related servers and devices and connectivity to other networks such as a corporate intranet, the Internet, public switched telephone network (PSTN), a Serving General Packet Radio Services (GPRS) Support Node (SGSN), a Gateway GPRS Support Node (GGSN), and may transport voice and data packets between each UE and such networks. A UE that has established an active traffic channel connection with one or more Node Bs may be referred to as an active UE, and can be referred to as being in a traffic state. A UE that is in the process of establishing an active traffic channel (TCH) connection with one or more Node Bs can be referred to as being in a connection setup state. A UE may be any data device that communicates through a wireless channel or through a wired channel. A UE may further be any of a number of types of devices including but not limited to PC card, compact flash device, external or internal modem, or wireless or wireline phone. The communication link through which the UE sends signals to the Node B(s) is called an uplink channel (e.g., a reverse traffic channel, a control channel, an access channel, etc.). The communication link through which Node B(s) send signals to a UE is called a downlink channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a block diagram of one exemplary embodiment of a wireless communications system 100 in accordance with at least one embodiment of the invention. System 100 can contain UEs, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or core network 126) and the UEs 102, 108, 110, 112. As shown here, the UE can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the term "UE" in other communication protocols (i.e., other than W-CDMA) may be referred to interchangeably as an "access terminal", "AT", "wireless device", "client device", "mobile terminal", "mobile station" and variations thereof.

Referring back to FIG. 1, the components of the wireless communications system 100 and interrelation of the elements of the exemplary embodiments of the invention are not limited to the configuration illustrated. System 100 is merely exemplary and can include any system that allows remote UEs, such as wireless client computing devices 102, 108, 110, 112 to communicate over-the-air between and among each other and/or between and among components connected via the air interface 104 and RAN 120, including, without limitation, core network 126, the Internet, PSTN, SGSN, GGSN and/or other remote servers.

The RAN 120 controls messages (typically sent as data packets) sent to a RNC 122. The RNC 122 is responsible for signaling, establishing, and tearing down bearer channels (i.e., data channels) between a Serving General Packet Radio Services (GPRS) Support Node (SGSN) and the UEs 102/108/110/112. If link layer encryption is enabled, the RNC 122 also encrypts the content before forwarding it over the air interface 104. The function of the RNC 122 is well-known in the art and will not be discussed further for the sake of brevity. The core network 126 may communicate with the RNC 122 by a network, the Internet and/or a public switched telephone network (PSTN). Alternatively, the RNC 122 may connect directly to the Internet or external network. Typically, the network or Internet connection between the core network 126 and the RNC 122 transfers data, and the PSTN transfers voice information. The RNC 122 can be connected to multiple Node Bs 124. In a similar manner to the core network 126, the RNC 122 is typically connected to the Node Bs 124 by a network, the Internet and/or PSTN for data transfer and/or voice information. The Node Bs 124 can broadcast data messages wirelessly to the UEs, such as cellular telephone 102. The Node Bs 124, RNC 122 and other components may form the RAN 120, as is known in the art. However, alternate configurations may also be used and the invention is not limited to the configuration illustrated. For example, in another embodiment the functionality of the RNC 122 and one or more of the Node Bs 124 may be collapsed into a single "hybrid" module having the functionality of both the RNC 122 and the Node B(s) 124.

Figure 2A:
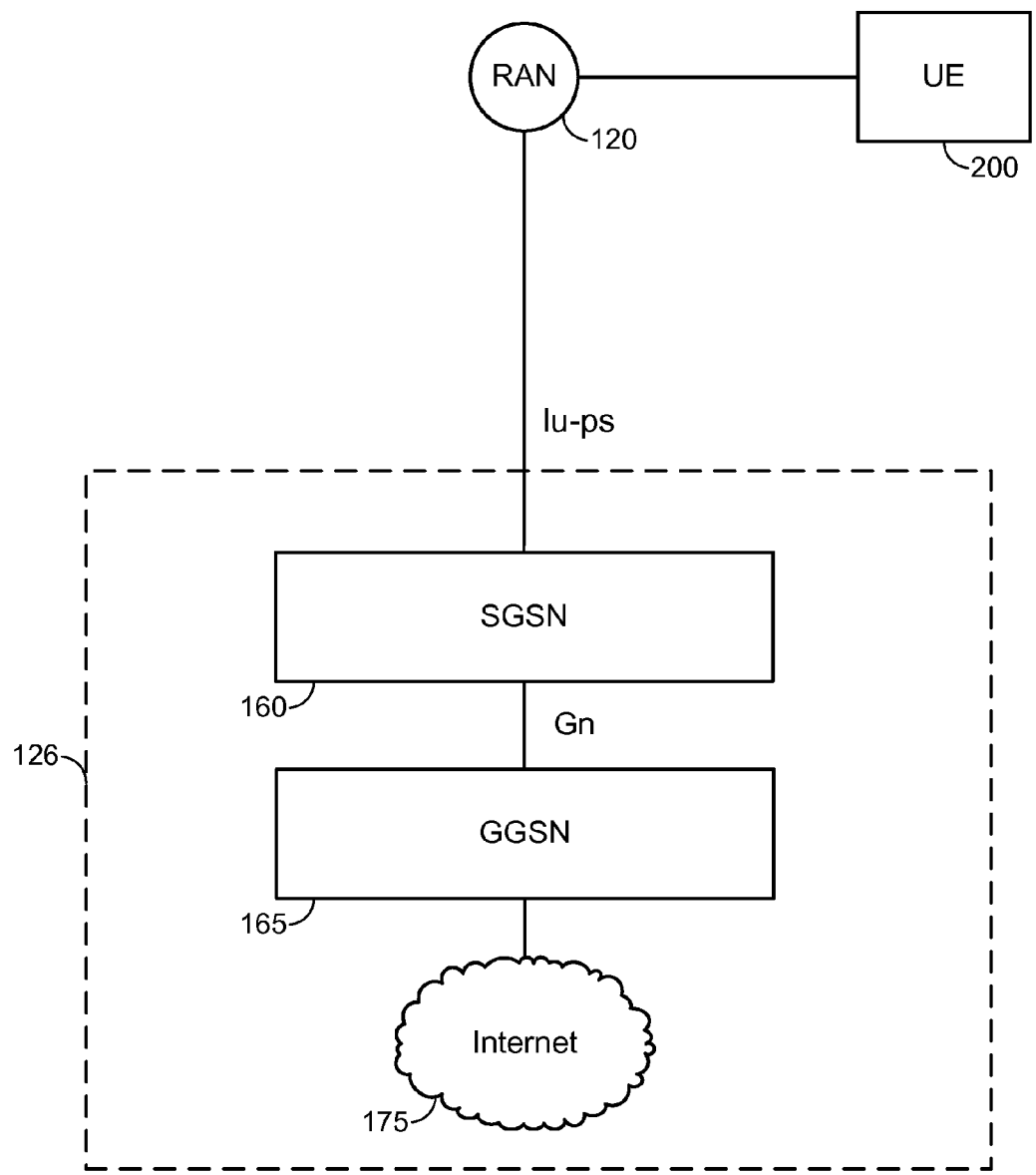
FIG. 2A illustrates the core network of FIG. 1 according to an embodiment.

FIG. 2A illustrates the core network 126 according to an embodiment of the present invention. In particular, FIG. 2A illustrates components of a General Packet Radio Services (GPRS) core network implemented within a W-CDMA system. In the embodiment of FIG. 2A, the core network 126 includes a Serving GPRS Support Node (SGSN) 160, a Gateway GPRS Support Node (GGSN) 165 and an Internet 175. However, it is appreciated that portions of the Internet 175 and/or other components may be located outside the core network in alternative embodiments.

Generally, GPRS is a protocol used by Global System for Mobile communications (GSM) phones for transmitting Internet Protocol (IP) packets. The GPRS Core Network (e.g., the GGSN 165 and one or more SGSNs 160) is the centralized part of the GPRS system and also provides support for W-CDMA based 3G networks. The GPRS core network is an integrated part of the GSM core network, provides mobility management, session management and transport for IP packet services in GSM and W-CDMA networks.

The GPRS Tunneling Protocol (GTP) is the defining IP protocol of the GPRS core network. The GTP is the protocol which allows end users (e.g., access terminals) of a GSM or W-CDMA network to move from place to place while continuing to connect to the internet as if from one location at the GGSN 165. This is achieved transferring the subscriber's data from the subscriber's current SSGN 160 to the GGSN 165, which is handling the subscriber's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2A, the GGSN 165 acts as an interface between the GPRS backbone network (not shown) and the external packet data network 175. The GGSN 165 extracts the packet data with associated packet data protocol (PDP) format (e.g., IP or PPP) from the GPRS packets coming from the SGSN 160, and sends the packets out on a corresponding packet data network. In the other direction, the incoming data packets are directed by the GGSN 165 to the SGSN 160 which manages and controls the Radio Access Bearer (RAB) of the destination UE served by the RAN 120. Thereby, the GGSN 165 stores the current SGSN address of the target UE and his/her profile in its location register (e.g., within a PDP context). The GGSN is responsible for IP address assignment and is the default router for the connected UE. The GGSN also performs authentication and charging functions.

The SGSN 160 is representative of one of many SGSNs within the core network 126, in an example. Each SGSN is responsible for the delivery of data packets from and to the UEs within an associated geographical service area. The tasks of the SGSN 160 includes packet routing and transfer, mobility management (e.g., attach/detach and location management), logical link management, and authentication and charging functions. The location register of the SGSN stores location information (e.g., current cell, current VLR) and user profiles (e.g., IMSI, PDP address(es) used in the packet data network) of all GPRS users registered with the SGSN 160, for example, within one or more PDP contexts for each user or UE. Thus, SGSNs are responsible for (i) de-tunneling downlink GTP packets from the GGSN 165, (ii) uplink tunnel IP packets toward the GGSN 165, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in Universal Mobile Telecommunications System (UMTS) system architecture) communicates with the SGSN 160 via a Iu interface, with a transmission protocol such as Frame Relay or IP. The SGSN 160 communicates with the GGSN 165 via a Gn interface, which is an IP-based interface between SGSN 160 and other SGSNs (not shown) and internal GGSNs, and uses the GTP protocol defined above (e.g., GTP-U, GTP-C, GTP', etc.). While not shown in FIG. 2A, the Gn interface is also used by the Domain Name System (DNS). The GGSN 165 is connected to a Public Data Network (PDN) (not shown), and in turn to the Internet 175, via a Gi interface with IP protocols either directly or through a Wireless Application Protocol (WAP) gateway.

The PDP context is a data structure present on both the SGSN 160 and the GGSN 165 which contains a particular UE's communication session information when the UE has an active GPRS session. When a UE wishes to initiate a GPRS communication session, the UE must first attach to the SGSN 160 and then activate a PDP context with the GGSN 165. This allocates a PDP context data structure in the SGSN 160 that the subscriber is currently visiting and the GGSN 165 serving the UE's access point.

Figure 2B:
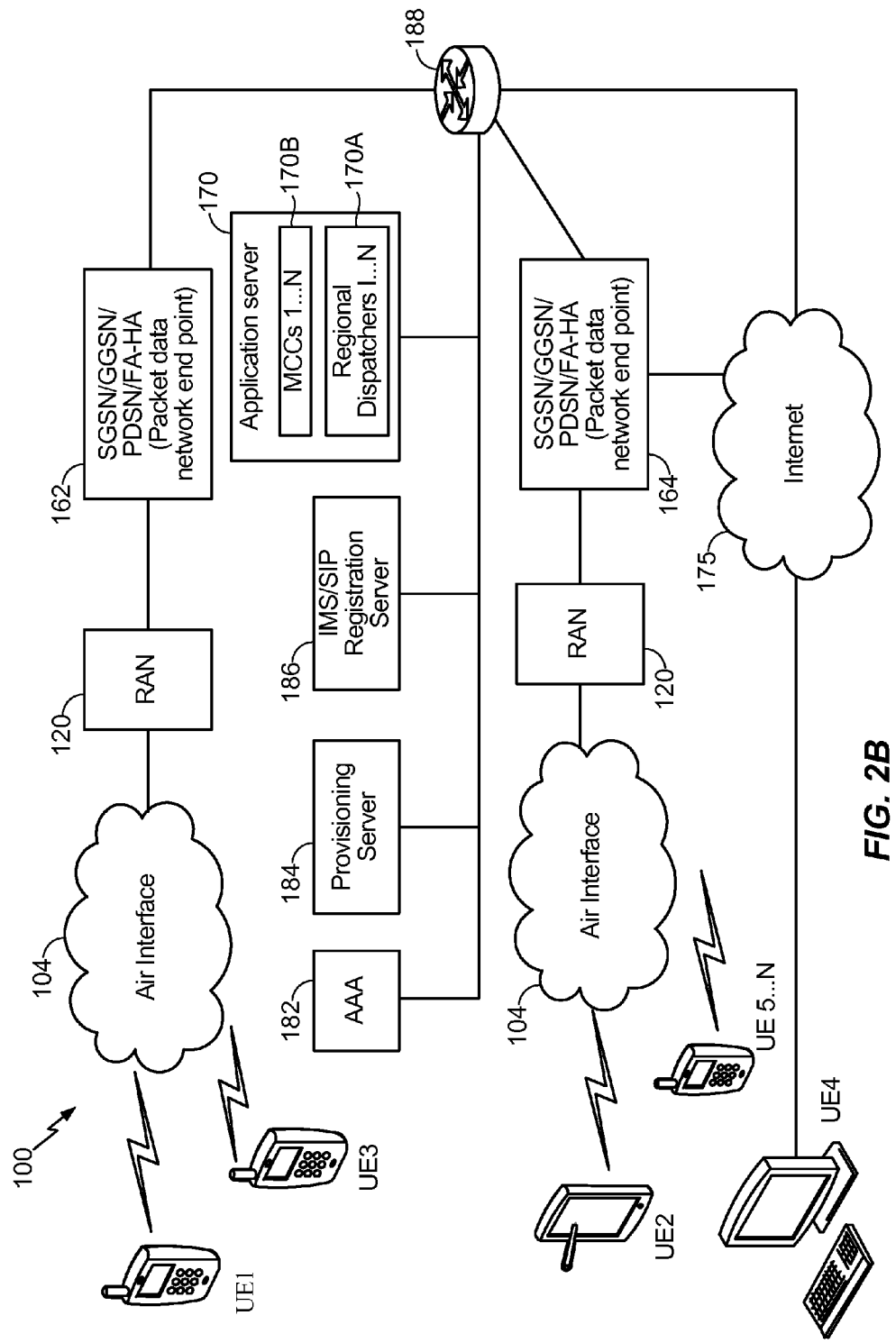
FIG. 2B illustrates an example of the wireless communications system of FIG. 1 in more detail.

FIG. 2B illustrates an example of the wireless communications system 100 of FIG. 1 in more detail. In particular, referring to FIG. 2B, UEs 1 . . . N are shown as connecting to the RAN 120 at locations serviced by different packet data network end-points. The illustration of FIG. 2B is specific to W-CDMA systems and terminology, although it will be appreciated how FIG. 2B could be modified to confirm with a 1x EV-DO system. Accordingly, UEs 1 and 3 connect to the RAN 120 at a portion served by a first packet data network end-point 162 (e.g., which may correspond to SGSN, GGSN, PDSN, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. UEs 2 and 5 . . . N connect to the RAN 120 at a portion served by a second packet data network end-point 164 (e.g., which may correspond to SGSN, GGSN, PDSN, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. UE 4 connects directly to the Internet 175, and through the Internet 175 can then connect to any of the system components described above.

Referring to FIG. 2B, UEs 1, 3 and 5 . . . N are illustrated as wireless cell-phones, UE 2 is illustrated as a wireless tablet-PC and UE 4 is illustrated as a wired desktop station. However, in other embodiments, it will be appreciated that the wireless communication system 100 can connect to any type of UE, and the examples illustrated in FIG. 2B are not intended to limit the types of UEs that may be implemented within the system. Also, while the AAA server 182, the provisioning server 184, the IMS/SIP registration server 186 and the application server 170 are each illustrated as structurally separate servers, one or more of these servers may be consolidated in at least one embodiment of the invention.

Further, referring to FIG. 2B, the application server 170 is illustrated as including a plurality of media control complexes (MCCs) 1 . . . N 170B, and a plurality of regional dispatchers 1 . . . N 170A. Collectively, the regional dispatchers 170A and MCCs 170B are included within the application server 170, which in at least one embodiment can correspond to a distributed network of servers that collectively functions to arbitrate communication sessions (e.g., half-duplex group communication sessions via IP unicasting and/or IP multicasting protocols) within the wireless communication system 100. For example, because the communication sessions arbitrated by the application server 170 can theoretically take place between UEs located anywhere within the system 100, multiple regional dispatchers 170A and MCCs are distributed to reduce latency for the arbitrated communication sessions (e.g., so that a MCC in North America is not relaying media back-and-forth between session participants located in China). Thus, when reference is made to the application server 170, it will be appreciated that the associated functionality can be enforced by one or more of the regional dispatchers 170A and/or one or more of the MCCs 170B. The regional dispatchers 170A are generally responsible for any functionality related to establishing a communication session (e.g., handling signaling messages between the UEs, scheduling and/or sending announce messages, etc.), whereas the MCCs 170B are responsible for hosting the communication session for the duration of the call instance, including conducting an in-call signaling and an actual exchange of media during an arbitrated communication session.

Figure 3:
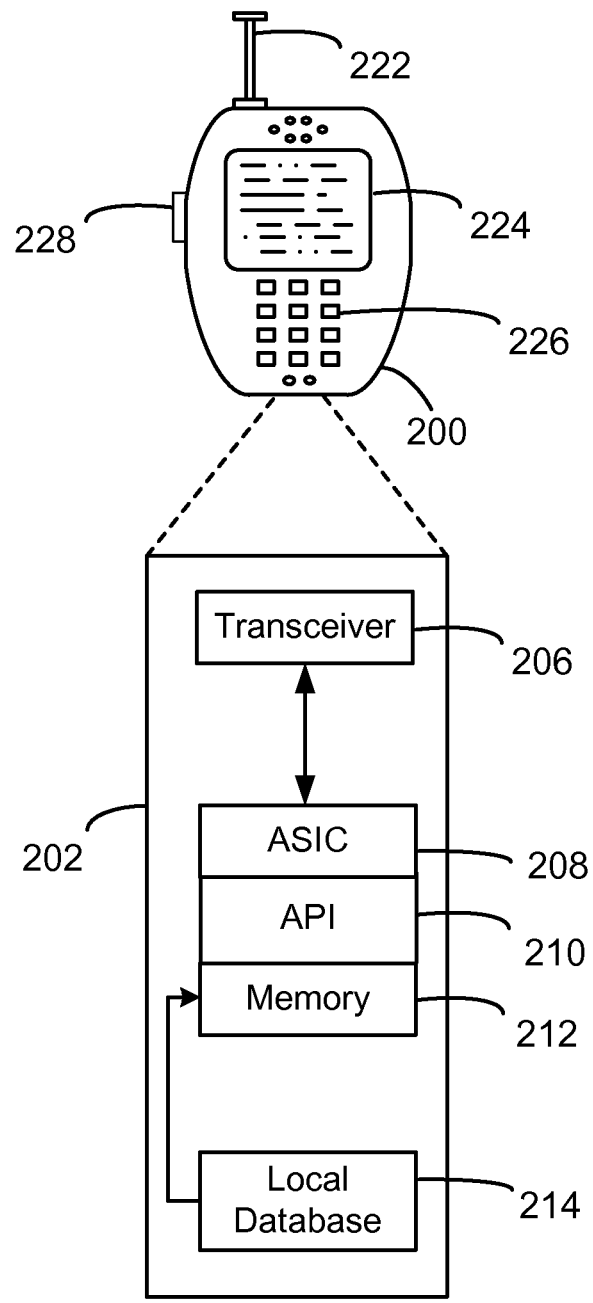
FIG. 3 is an illustration of a user equipment (UE) in accordance with at least one embodiment.

Referring to FIG. 3, a UE 200, (here a wireless device), such as a cellular telephone, has a platform 202 that can receive and execute software applications, data and/or commands transmitted from the RAN 120 that may ultimately come from the core network 126, the Internet and/or other remote servers and networks. The platform 202 can include a transceiver 206 operably coupled to an application specific integrated circuit (ASIC) 208, or other processor, microprocessor, logic circuit, or other data processing device. The ASIC 208 or other processor executes the application programming interface (API) 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UE 200 in FIG. 3 are to be considered merely illustrative and the invention is not limited to the illustrated features or arrangement.

The wireless communication between the UE 102 or 200 and the RAN 120 can be based on different technologies, such as code division multiple access (CDMA), W-CDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. For example, in W-CDMA, the data communication is typically between the client device 102, Node B(s) 124, and the RNC 122. The RNC 122 can be connected to multiple data networks such as the core network 126, PSTN, the Internet, a virtual private network, a SGSN, a GGSN and the like, thus allowing the UE 102 or 200 access to a broader communication network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 4:
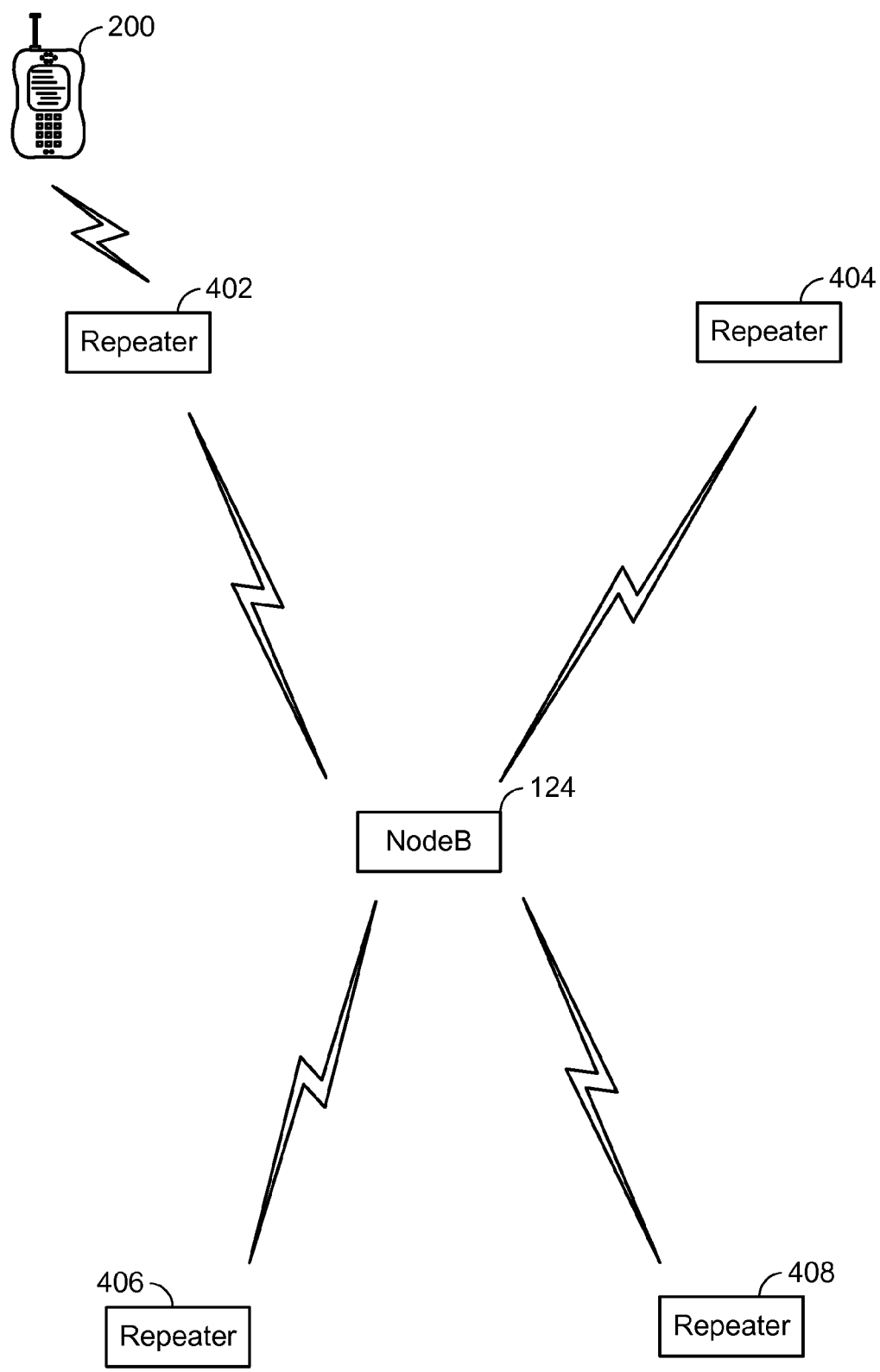
FIG. 4 illustrates a portion of a wireless communications system whereby a plurality of repeaters are positioned so as to extend the coverage area of a particular Node B.

FIG. 4 illustrates a portion of the wireless communications system 100 whereby a plurality of repeaters 402, 404, 406 and 408 are positioned so as to extend the coverage area of a particular Node B 124. Accordingly, each of repeaters 402 through 408 are positioned in range of the Node B 124's wireless transmissions such that the respective repeaters can receive and retransmit the signals from the Node B 124. Also, UE 200 is positioned out of the direct range or coverage area of the Node B 124, but in range of the extended coverage area provided by the repeater 402. Thus, via repeater 402, the Node B 124 can transmit data to UE 200, and UE 200 can likewise transmit data to the Node B 124.

In an example, the repeaters 402 through 408 can be implemented as on-frequency repeaters, such that communication between the repeaters 402 through 408 and the UEs in the Node B's 124 serving sector(s) occurs on a first frequency, and communication between the repeaters 402 through 408 and the Node B 124 occurs on the same first frequency. In this case, the repeaters 402 and 408 receive a donor signal (e.g., a downlink signal from Node B 124 or an uplink signal from UE 200) on the first frequency, and then re-transmit an amplified version of the donor signal on the same first frequency. For convenience of explanation, the embodiments illustrated in the FIGS and described below are primarily directed to a single-carrier or on-frequency repeater implementation.

Alternatively, in another on-frequency repeater implementation, multiple donor signals can be received on a plurality of carriers or frequencies (e.g., in the uplink and/or downlink directions), with each donor signal amplified and repeated by repeaters 402 through 408 on the same respective frequency on which it was received.

In another alternative example, the repeaters 402 through 408 can be implemented as frequency-translating repeaters, such that communication between the repeaters 402 through 408 and the UEs in the Node B's 124 serving sector(s) occurs on a first frequency, and communication between the repeaters 402 through 408 and the Node B 124 occurs on a second frequency. In this case, the repeaters 402 and 408 receive a donor signal (e.g., a downlink signal from Node B 124 or an uplink signal from UE 200) on one of the frequencies, translate the donor signal to the other frequency, and then transmit the translated signal on the other frequency.

While not shown explicitly in FIG. 4, it will be appreciated that two or more of repeaters 402 through 408 can be positioned in close geographic proximity such that wireless transmissions from a given repeater can interfere with reception at one or more of the other repeaters.

Figure 5:
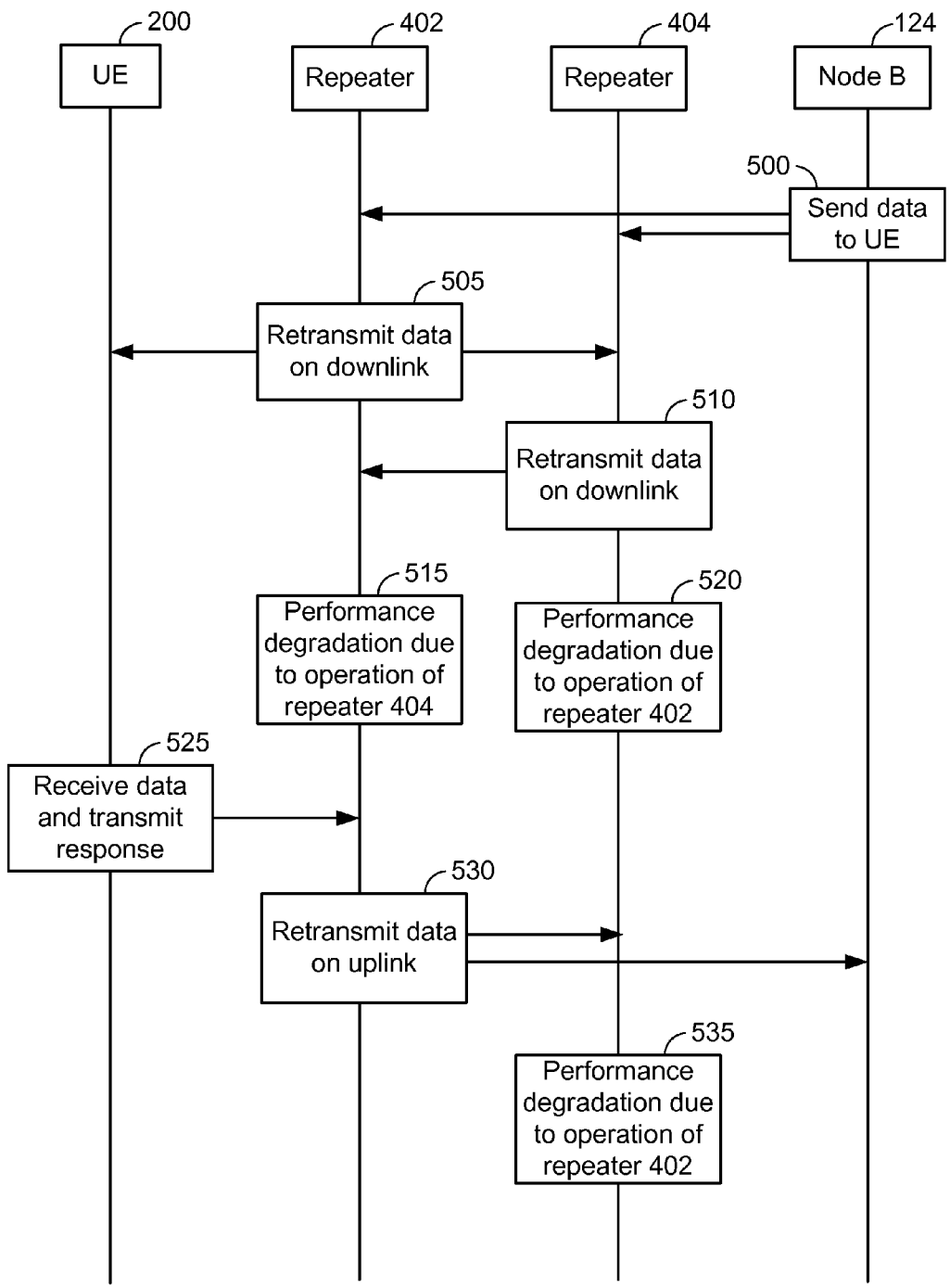
FIG. 5 illustrates a conventional manner by which repeaters can repeat signals between a UE and a Node B.

FIG. 5 illustrates a conventional manner by which repeaters 402 and 404 can repeat signals between UE 200 and Node B 124. In FIG. 5, it is assumed repeaters 402 and 404 are close enough such that their respective transmissions each interfere with reception at the other repeater.

Referring to FIG. 5, the Node B 124 transmits data to UE 200, 500. While not shown in FIG. 5, the application server 170 can forward data to the Node B for transmission to UE 200, resulting in the data transmission of 500. As described above with respect to FIG. 4, UE 200 is not in direct wireless range of Node B 124. Accordingly, the data transmission of 500 is received by repeaters 402 and 404, and not by UE 200 at this point. While not shown explicitly in FIG. 5, repeaters 406 and 408 can also receive the data transmission of 500.

Upon receiving the downlink data transmission for UE 200 from the Node B 124 in 500, repeater 402 retransmits the data to UE 200, 505. Although the target UE (i.e., UE 200) is not in range of repeater 404, repeater 404 also receives the downlink data transmission for UE 200 from the Node B 124 in 500, and repeater 404 also retransmits the data, 510. As shown via arrows in FIG. 5, the retransmission of the downlink data from repeater 402 reaches the target UE (i.e., UE 200), and also reaches the repeater 404. Likewise, the retransmission of the downlink data from repeater 404 reaches the repeater 402. These respective interfering signals cause performance degradation at both repeater 402, 515, and also at repeater 404, 520 (see 535 of FIG. 5). For example, the respective retransmissions of the downlink data by repeaters 402 and 404 can interfere with the respective repeaters' ability to decode incoming data from the Node B 124. In another example, the retransmissions from the respective repeaters can be again retransmitted, which can cause feedback in the system. As noted above, for convenience of explanation, it may be assumed that FIG. 5 is implemented via a single-frequency or on-frequency repeater implementation, such that the UE 200, the Node B 124 and the repeaters 402 and 404 are each transmitting (and receiving) on the same frequency. It will be appreciated that, in other implementations, in-band interference can also occur whenever a transmitting entity (e.g., repeaters 402 and 404, the UE 200 or Node B 124) are transmitting upon the same frequency upon which a receiving entity is receiving other data.

Referring to FIG. 5, assume that UE 200 receives the retransmission of the downlink data from repeater 402, 525, and responds to the downlink data (e.g., an announce message for a communication session, a text message, etc.) with reverse-link or uplink data for transmission to the Node B 124. Accordingly, because UE 200 is in range of repeater 402 (and not repeater 404), repeater 402 receives and retransmits the uplink data from UE 200 to the Node B 124, 530. As shown via arrows in FIG. 5, the retransmission of the uplink data from repeater 402 reaches the Node B 124, and also reaches the repeater 404. Thus, the retransmission from repeater 402 at 530 causes performance degradation at repeater 404. For example, the retransmission of the uplink data from repeater 402 can interfere with the repeater 404's ability to receive uplink data from other UEs and/or the Node B 124.

Conventionally, the above-noted problems associated with interfering repeaters can be reduced by positioning repeaters far apart from each other geographically. However, this can also limit the coverage area extension provided by the repeaters, resulting in coverage gaps. Accordingly, embodiments of the invention are directed to implementing interference reduction mechanisms at repeaters in a wireless communications system. In particular, one or more repeaters deployed within the wireless communications systems are configured to transmit continuous (e.g., periodic) and/or intermittent (e.g., event-triggered) beacon signals. Other repeaters can then use the beacon signals to reduce interference associated with retransmissions from the beacon-transmitting repeater(s) in the uplink and/or downlink direction, as will be described in greater detail below.

Figure 6A:
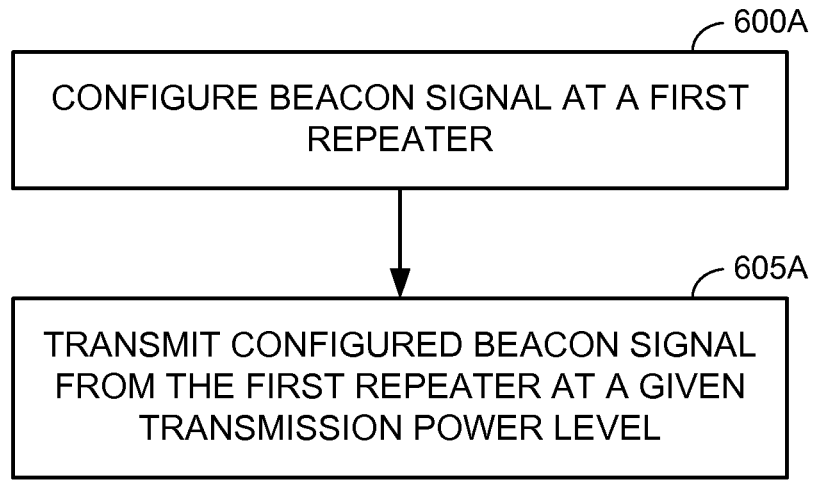
FIG. 6A illustrates a process of transmitting a beacon signal from a repeater in accordance with an embodiment of the invention.

FIG. 6A illustrates a process of transmitting a beacon signal from a first repeater in accordance with an embodiment of the invention. Referring to FIG. 6A, the first repeater (e.g., any of repeaters 402 through 408) configures a beacon signal for transmission, 600A. In an example, the beacon signal is configured to function as a signature signal that identifies the first repeater to other repeaters in relatively close physical proximity to the first repeater. In a further example, the configuration of the beacon signal by the first repeater in 600A can include selecting a pseudo-noise (PN) sequence or offset from a given set of PN sequences. In an example, the selection of the PN sequence or offset can be performed in a pseudo-random manner. For example, the selection of the PN sequence or offset can be based on a hash function of a unique identifier (ID) (e.g., at least, unique within a given serving area of the wireless communications system, such as a sector) associated with the first repeater's to ensure that other repeaters co-located with the first repeater do not use the same PN sequence or offset. In a further example, the unique ID used in the hash function to select the PN sequence or offset can correspond to a media access control (MAC) ID of the first repeater.

After configuring the beacon signal in 600A, the first repeater transmits the configured beacon signal from the first repeater at a given transmission power level, 605A. As will be appreciated, unlike other transmissions from the repeaters 402 through 408, the transmission of 605A is not a 're'-transmission because the configured beacon signal is internally generated at the beacon signal, and is not a retransmission of a donor signal provided from an external entity.

In an embodiment of the invention, the given transmission power level at which the beacon signal is transmitted need not be the same transmission power level at which retransmissions (e.g., in either the uplink or downlink direction) are performed. For example, the configured beacon signal in 605A can be transmitted at a lower transmission power level than retransmissions made by the first repeater in the uplink and/or downlink directions in at least one embodiment of the invention. As will be appreciated, the beacon signal configured in 600A is not part of the donor signals that the first repeater is responsible for amplifying and retransmitting. Therefore, the configured beacon signal, once transmitted, is associated with its own interference/noise and should be maintained in the lower transmission power level, while still being transmitted with sufficient strength at least reach the neighboring repeater(s) of the first repeater that are affected by the first repeater's donor signal retransmissions. For example, if a desired output signal to noise ratio (SNR) of the repeater is -15 dB, the average transmission power level for the transmitted beacon signal at 605A can be at least 15 dB lower than the transmitted donor signal.

In another embodiment of the invention, with reference to 605A of FIG. 6A, the transmission of the configured beacon signal can occur on a periodic or continuous basis. For example, the period at which the configured beacon signal is transmitted by the first repeater can be every 5 seconds, every 30 seconds, etc.

It will be appreciated that FIG. 6A is described-above with respect to the transmission of a beacon signal at one particular frequency (e.g., for a single-frequency or on-frequency repeater for reasons discussed above). In other embodiments, it will be appreciated that the process of FIG. 6A can be performed for each frequency or carrier upon which the first repeater is re-transmitting donor signals. Thus, two (or more) frequency-distinct beacon signals can be transmitted by the first repeater in other embodiments of the invention.

Figure 6B:
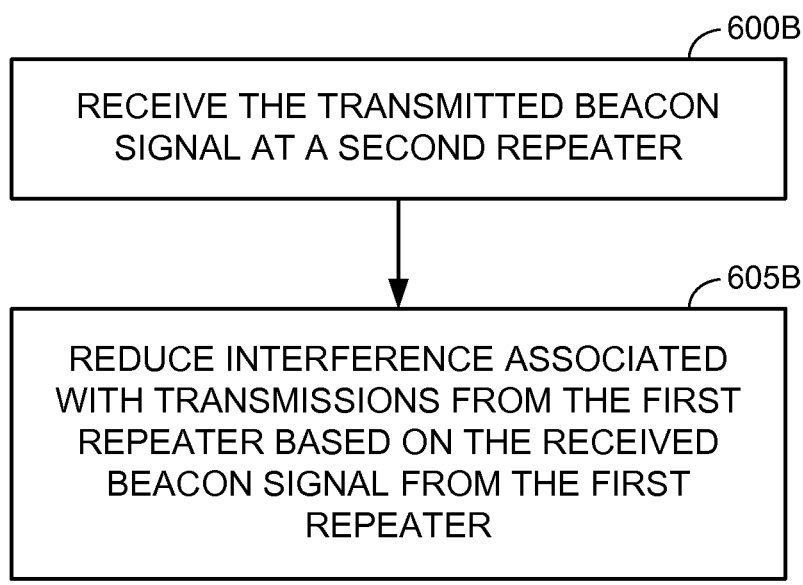
FIG. 6B illustrates a process of reducing interference based on a transmitted beacon signal at a repeater in accordance with an embodiment of the invention.

FIG. 6B illustrates a process of reducing interference based on a transmitted beacon signal at a second repeater in accordance with an embodiment of the invention. Referring to FIG. 6B, assume that the first repeater is in relative close proximity to the second repeater, such that the second repeater receives the transmitted beacon signal from 605A, 600B. Because the transmitted beacon signal is configured to identify the first repeater, the second repeater is able to distinguish the transmitted beacon signal from donor signals (i.e., uplink and/or downlink signals to be repeated or retransmitted by the second repeater). For example, the beacon signal from the first repeater can be configured with a different PN offset or sequence as compared to beacon signals from other repeaters and/or a pilot signal from the Node B 124.

After receiving the transmitted beacon signal at the second repeater, the second repeater uses the transmitted beacon signal to reduce interference associated with retransmissions from the first repeater, 605B. For example, by identifying the transmitted beacon signal as being from a source that carries signals that are not intended for retransmission by the second repeater, the second repeater can refrain from retransmitting signals from the first repeater so as to reduce feedback in the system. In another example, the second repeater can analyze parameters associated with the transmitted beacon signal so as to nullify or avoid via beamforming and/or other interference reduction techniques, as is known in the art. Further, upon detecting the transmitted beacon signal from the first repeater in 600B, the second repeater can reduce interference associated with transmissions to and/or from the first repeater either by reducing the retransmission power level of the second repeater and/or by steering its transmission and receiving antennas away from the direction in which the transmitted beacon signal is detected.

It will be appreciated that FIG. 6B is described-above with respect to reducing interference at the second repeater in association with transmitted beacon signals at one particular frequency (e.g., for a single-frequency or on-frequency repeater for reasons discussed above). In other embodiments, it will be appreciated that the process of FIG. 6B can be performed for each frequency or carrier upon beacon signals are sent by the first repeater and received at the second repeater. Thus, two (or more) frequency-distinct beacon signals can be transmitted by the first repeater in other embodiments of the invention, and each of the respective beacon signals can be used by the second repeater for interference reduction.

Figure 7:
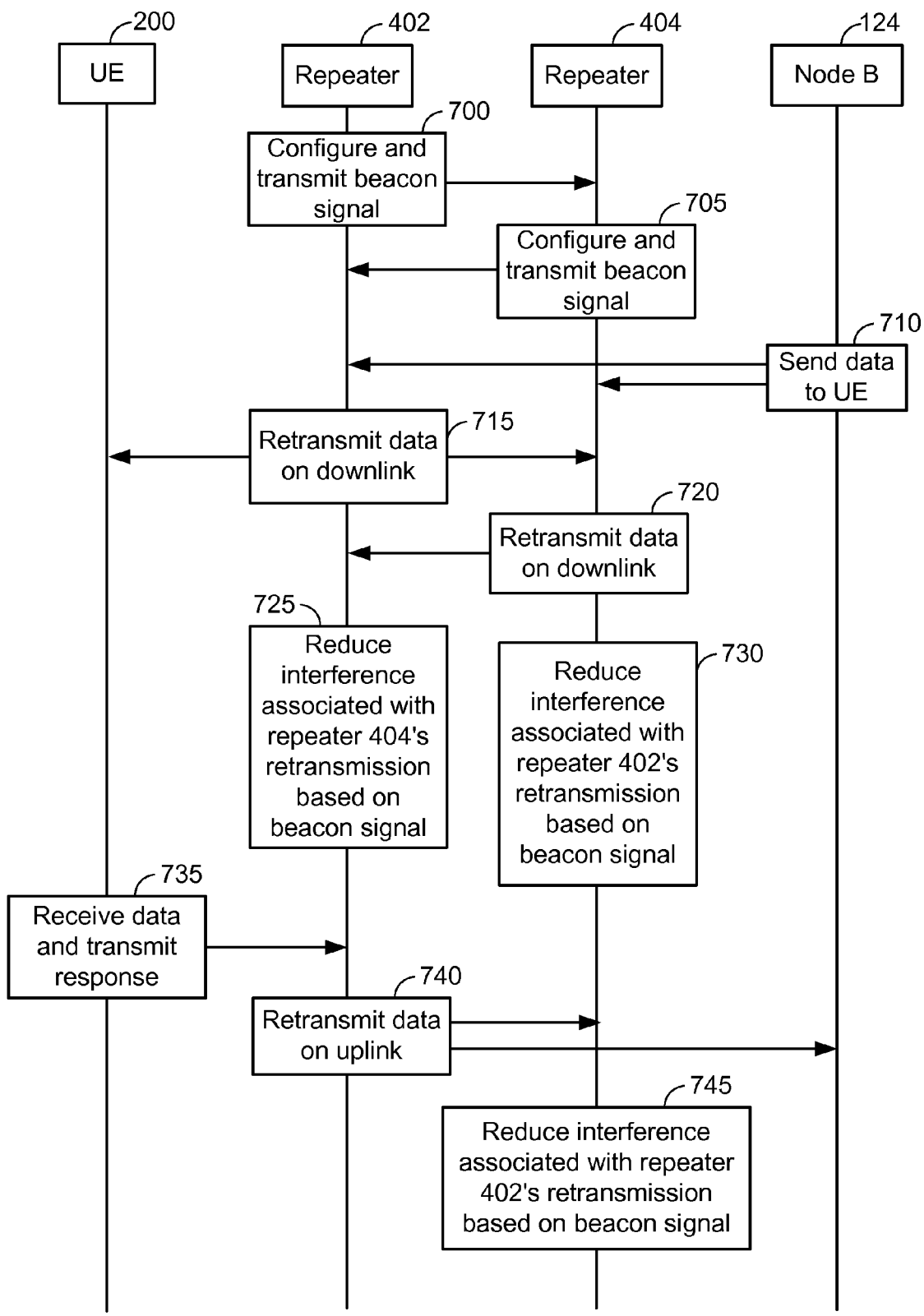
FIG. 7 illustrates a process by which repeaters can repeat signals between a UE and a Node B in accordance with an embodiment of the invention.

FIG. 7 illustrates a process by which repeaters 402 and 404 can repeat signals between UE 200 and Node B 124 in accordance with an embodiment of the invention. In FIG. 7, it is assumed repeaters 402 and 404 are close enough such that their respective transmissions each interfere with reception at the other repeater.

Referring to FIG. 7, repeater 402 executes the process of FIG. 6A in 700, such that repeater 402 configures a first beacon signal and then transmits the configured first beacon signal at a given transmission power level, which is then received by repeater 404. Likewise, repeater 404 also executes the process of FIG. 6A in 705, such that repeater 404 configures a second beacon signal and then transmits the configured second beacon signal at a given transmission power level (e.g., which can be the same or different as the transmission power level of the beacon signal from repeater 402), which is then received by repeater 402.

At some later point in time, assume that the Node B 124 transmits data to UE 200, 710. While not shown in FIG. 7, the application server 170 can forward data to the Node B for transmission to UE 200, resulting in the data transmission of 710. As described above with respect to FIG. 4, UE 200 is not in direct wireless range of Node B 124. Accordingly, the data transmission of 710 is received by repeaters 402 and 404. While not shown explicitly in FIG. 7, repeaters 406 and 408 can also receive the data transmission of 710.

Upon receiving the downlink data transmission for UE 200 from the Node B 124 in 710, repeater 402 retransmits the data to UE 200, 715. Although the target UE (i.e., UE 200) is not in range of repeater 404, repeater 404 also receives the downlink data transmission for UE 200 from the Node B 124 in 715, and repeater 404 also retransmits the data, 720. As shown via arrows in FIG. 7, the retransmission of the downlink data from repeater 402 reaches the target UE (i.e., UE 200), but also reaches the repeater 404. Likewise, the retransmission of the downlink data from repeater 404 reaches the repeater 402.

In the process of FIG. 7, repeaters 402 and 404 also execute the process of FIG. 6B upon receipt of the first and second beacon signal transmissions in 705 and 700, respectively.

Thus, each of repeaters 402 and 404 is prepared to reduce interference associated with the retransmissions of 730 and 725, respectively, based in part on the earlier transmission of the beacon signals in 705 and 700, respectively. Thereby, as in 605B of FIG. 6B, repeater 402 reduces interference associated with repeater 404's retransmission of 720 based on the beacon signal from 705. Likewise, as in 605B of FIG. 6B, repeater 404 also reduces interference associated with repeater 402's retransmission of 715 based on the beacon signal from 700. Thus, the operation of repeaters 402 and 404 need not be degraded by virtue of the transmission of their respective beacon signals.

Referring to FIG. 7, assume that UE 200 receives the retransmission of the downlink data from repeater 402, 735, and responds to the downlink data (e.g., an announce message for a communication session, a text message, etc.) with reverse-link or uplink data for transmission to the Node B 124. Accordingly, because UE 200 is in range of repeater 402 (and not repeater 404), repeater 402 receives and retransmits the uplink data from UE 200 to the Node B 124, 740. As shown via arrows in FIG. 5, the retransmission of the uplink data from repeater 402 reaches the Node B 124, but also reaches the repeater 404. At this point, as described above with respect to 605B of FIGS. 6B and 730, repeater 404 reduces interference associated with repeater 402's retransmission of 735 based on the beacon signal from 700.

As noted above, for convenience of explanation, it may be assumed that FIG. 7 is implemented via a single-frequency or on-frequency repeater implementation, such that the UE 200, the Node B 124 and the repeaters 402 and 404 are each transmitting (and receiving) on the same frequency. However, it will be appreciated that, in other implementations, repeaters 402 and 404 can each transmit upon multiple different frequencies or carriers. In this case, the interference reduction shown above at 725, 730 and/or 745 can be associated with the frequency or carrier upon which the retransmission donor signal is transmitted at 720, 715 and 740, respectively.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating a repeater within a wireless communications system, comprising:
   configuring a beacon signal that identifies the repeater to one or more other repeaters; and
   transmitting the configured beacon signal at a given transmission power level to the one or more other repeaters,
   wherein the given transmission power level is less than an uplink transmission power level at which uplink signals are repeated by the repeater in an uplink direction and/or a downlink transmission power at which downlink signals are repeated by the repeater in a downlink direction.

2. The method of claim 1, wherein the given transmission power level is less than the uplink transmission power level at which the uplink signals are repeated by the repeater in the uplink direction.

3. The method of claim 1, wherein the given transmission power level is less than the downlink transmission power level at which the downlink signals are repeated by the repeater in the downlink direction.

4. The method of claim 1, wherein the configured beacon signal is configured based on an identifier that uniquely identifies the repeater within a given serving area of the wireless communications system.

5. The method of claim 4, wherein the configuring step includes:
   selecting a pseudo-noise (PN) sequence from a set of PN sequences based on a hash function of the identifier.

6. The method of claim 4, wherein the identifier corresponds to a media access control (MAC) identifier.

7. The method of claim 1, wherein the transmitting step is performed on a periodic basis.

8. The method of claim 1, wherein the transmitting step is performed on a continuous basis.

9. The method of claim 1, further comprising:
   performing the configuring and transmitting steps for each frequency or carrier upon which the repeater is responsible for retransmitting donor signals.

10. The method of claim 1,
    wherein the repeater and the one or more other repeaters are fixed wireless repeaters that are each configured to receive first wireless donor signals on a first link and to retransmit the first wireless donor signals on a second link, and
    wherein the repeater and the one or more other repeaters are also configured to receive second wireless donor signals on the second link and to retransmit the second wireless donor signals on the first link.

11. The method of claim 10,
    wherein the first link is between the respective repeater and a base station, and
    wherein the second link is between the respective repeater and one or more client devices being served by the base station.

12. The method of claim 11,
    wherein the first wireless donor signals are downlink signals from the base station to the one or more client devices, and
    wherein the second wireless donor signals are uplink signals from the one or more client devices to the base station.

13. A repeater within a wireless communications system, comprising:
    means for configuring a beacon signal that identifies the repeater to one or more other repeaters; and
    means for transmitting the configured beacon signal at a given transmission power level to the one or more other repeaters, wherein the given transmission power level is less than an uplink transmission power level at which uplink signals are repeated by the repeater in an uplink direction and/or a downlink transmission power at which downlink signals are repeated by the repeater in a downlink direction.

14. A repeater within a wireless communications system, comprising:
- logic configured to configure a beacon signal that identifies the repeater to one or more other repeaters; and
- logic configured to transmit the configured beacon signal at a given transmission power level to the one or more other repeaters,
- wherein the given transmission power level is less than an uplink transmission power level at which uplink signals are repeated by the repeater in an uplink direction and/or a downlink transmission power at which downlink signals are repeated by the repeater in a downlink direction.

15. A non-transitory computer-readable storage medium containing instructions stored thereon, which, when executed by a repeater within a wireless communications system, cause the repeater to perform operations, the instructions comprising:
- program code to configure a beacon signal that identifies the repeater to one or more other repeaters; and
- program code to transmit the configured beacon signal at a given transmission power level to the one or more other repeaters,
- wherein the given transmission power level is less than an uplink transmission power level at which uplink signals are repeated by the repeater in an uplink direction and/or a downlink transmission power at which downlink signals are repeated by the repeater in a downlink direction.

* * * * *